Dec. 28, 1948.    R. F. KUNS    2,457,567
BOAT TRAILER

Filed July 10, 1945    3 Sheets-Sheet 1

INVENTOR.
Roy F. Kuns
BY
Attorney

Dec. 28, 1948.  R. F. KUNS  2,457,567
BOAT TRAILER

Filed July 10, 1945  3 Sheets-Sheet 2

INVENTOR.
BY

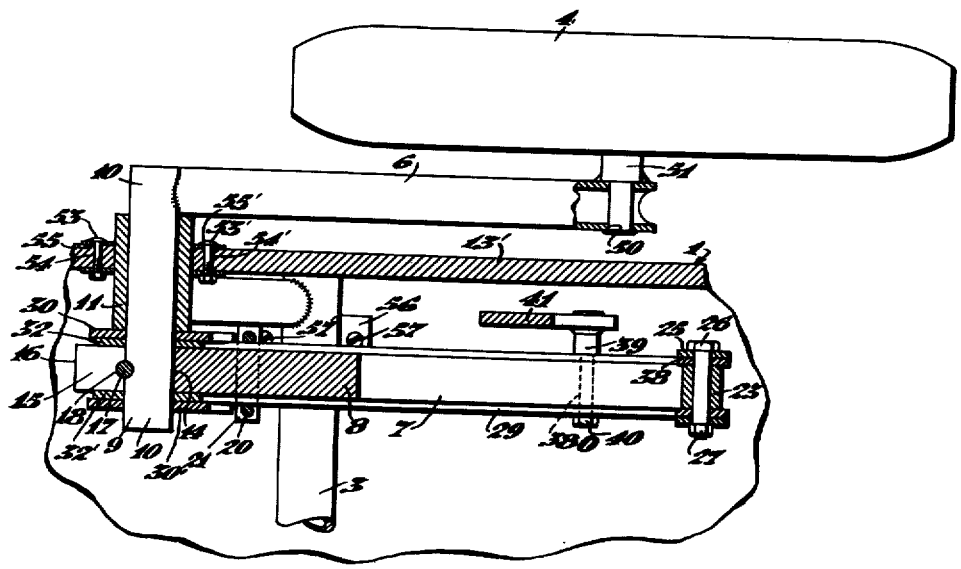

Patented Dec. 28, 1948

2,457,567

UNITED STATES PATENT OFFICE 2,457,567

BOAT TRAILER

Ray F. Kuns, Cincinnati, Ohio

Application July 10, 1945, Serial No. 604,180

3 Claims. (Cl. 9—1)

The invention relates particularly but not exclusively, to spring and frame construction of two wheel boat-trailers adapted for use of tourists, campers, sportsmen, rescue squads and military personnel, and others having use for a boat-trailer having retractable wheels.

Heretofore, users of trailers of the boat type have experienced considerable inconvenience because both a boat unit and a trailer unit separate from each other was of necessity provided. Moreover, it has been necessary for boat users, when transporting their boats overland, to utilize some form of a detachable trailer with a boat cradle for use in launching and landing the boat. It has long been recognized that landing boats from water by means of a trailer is particularly difficult and dangerous as the boats are inconveniently cradled to the trailer in the water since the buoyancy of the trailer, the tires and a usual wood cradle causes the trailer to float on the water.

Frequently it is desirable to launch a boat at one point and land it at another location far removed from where it was launched. For this and other reasons it is desirable to have the boat and trailer an integral unit.

An important object of the invention is to provide a simple, efficient and practical boat-trailer readily, safely and conveniently convertible from a land going vehicle to a water going craft.

Other objects of the invention are to provide a permanent and simple, efficient, safe, practical and durable landing and launching gear or device for a boat which may be quickly and conveniently manually positioned with the wheels of the device in a downward position to permit transporting the boat into or out of the water and also to position said wheels in an upward position to permit efficient use of said boat in water; to provide an independently sprung and mounted wheel unit for efficient cushioning of both the boat and the trailer load when used on highways; to provide means for landing or launching one side of the boat independently of the other side; to provide means to position the retracted wheels and gears, whereby they will not interfere with normal use of said boat by the occupants and useful as a buffer or cushion against chafing against docks; to provide means which retains the wheels, gears and the like in retracted position or in extended or downward positions; to provide means for adjusting the independently sprung wheel units to varying weight of the load to be carried in the boat-trailer; to provide an overload spring and saddle block bumper adapted to compensate for sudden or unusual road shocks while the boat-trailer is being transported over a highway; and to provide a manually operated lever for lowering or elevating said wheels and units when the boat is in the water or on the land.

Other objects of the invention will be apparent by reference to the drawing, the hereinafter descriptive matter and the claims.

The invention consists in providing a boat equipped with two independent suspension units, each of said units having a road wheel mounted on a wheel spindle mounted in an end of a leg having an axle tube spindle mounted on its other end and extending through the upper ends of a tubular drop axle, said ends mounted in and through the sides of the boat, each of said tube spindles extending from the outside of the boat through the axle ends to the inside of the boat, the inner ends of each of said axle tube spindles being rigidly received in a saddle block on which is mounted a normal load spring, said spring being rotatable, said tube spindle supporting rotatable mounting brackets for a lower frame member and an upper overload spring, said brackets being mounted in juxta position to the end of the saddle block. The normal load spring, the frame member and the overload spring are connected at their ends opposite the tube spindle by shackles. A control lever is provided with a frame member, a connecting link, pivot pins, a mounting bracket, a locking bolt and anchor members whereby the entire unit may be manually controlled to raise or lower the road wheels and secure them in upward positions when the boat-trailer is being used as a boat and to lower the road wheels and secure them in lowered and road contacting positions when the boat-trailer is being used as a trailer and being transported over a highway.

The invention also consists in the combination of the elements, arrangements of parts and in the details of the construction, as hereinafter claimed.

In the drawings:

Figure 5 is a section taken on the line 5—5 in Figure 2, with parts broken away and parts removed;

Figure 6 is a section taken on the line 6—6 in Figure 3, with parts broken away and parts removed; and Figure 7 is a section taken on line 7—7 in Figure 2.

Figure 1:
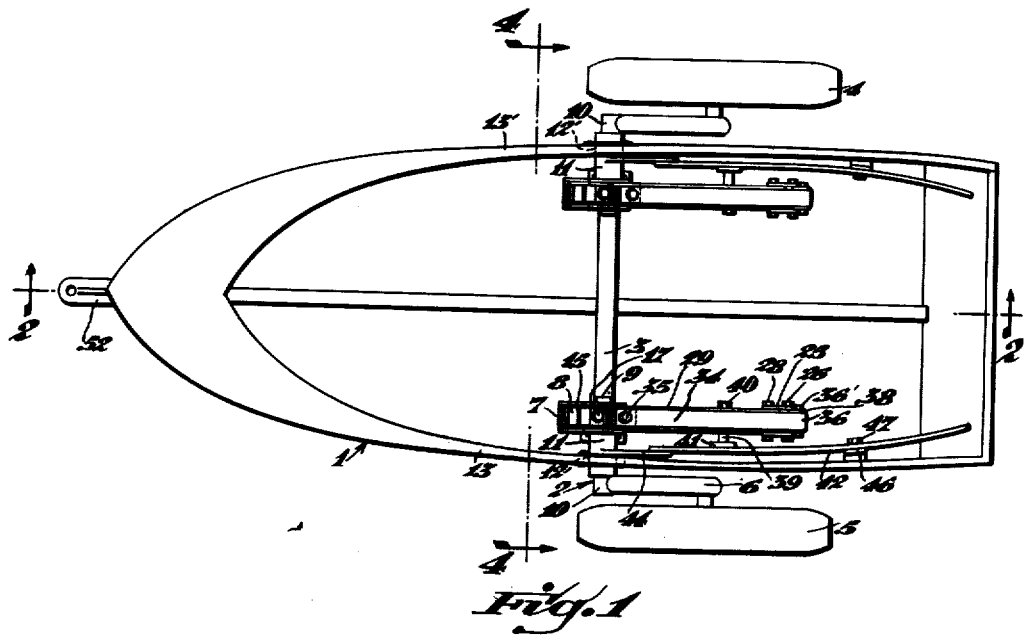
Figure 1 is a plan view of the boat-trailer, and showing the invention incorporated therewith.

In the preferred construction of the invention, I provide the boat or boat hull 1 and the trailer chassis 2. The trailer chassis extends transversely of or at right angles to the center lines 2—2 shown in Fig. 1. Extending transversely of the hull 1 is the drop axle 3. The independently sprung wheels 4 and 5 are supported on the legs 6 outside the boat hull.

The springs 7 are positioned inside the boat hull and each spring is mounted under the saddle blocks 8 which are rigidly locked to the inner ends 9 of the spindles 10. The outer ends of the spindles 10 are welded to the legs 6 which are outside the boat 1. The spindles 10 are rotatably received in the tubes 11.

The drop axle 3 has mounted on its ends the axle tubes 11. The outer ends of the tubes 11 project through holes 12 and 12' in the sides 13 and 13' of the boat hull 1. The holes 12 and 12' are above the water line of the hull.

Each saddle block 8 has the hole 14 therein which receives the axle tube spindle 10. A slot 15 is formed in the end 16 of the saddle block 8 and from the hole 14 to the outside of the block. The saddle block is clamped tightly onto the tube spindle 10 by means of the bolt 17 received through the hole 18. The bolt 17 is also used for attaching the spring 7 to the forward end of the saddle block and passes through the hole 19 in the end of the spring 7.

Figure 2:
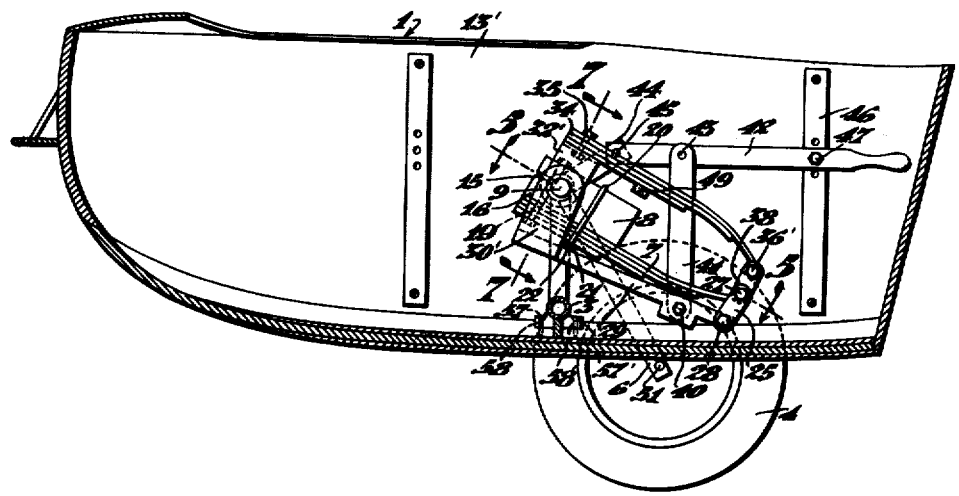
Figure 2 is a section taken on a line corresponding to 2—2 in Figure 1, with the wheel unit extended or lowered in position for road travel.

An additional means of clamping and retaining the spring 7 against the under surface of the saddle block 8 comprises the U bolt 20, the bar 21 and the nuts 22 shown in Fig. 2.

The rear end of the normal load spring 7 has an eye 23 formed on its rear end 24. Assembled to this spring eye are the shackles 25 held by means of the bolt 26 and the nut 27. The lower ends of the shackles 25 are attached, by means of the bolt 28, to the frame member 29. The forward end of the frame member 29 is welded to the side plates 30 and 30' to form a U-shape bracket mounting.

The frame member mounting side plates 30 and 30' have the holes 31 and 31' received on the inner end of the axle tube spindle 10 where it projects through the axle tube 11 inside the boat in order to provide a bearing for oscillation at the tube spindle therein when spring action occurs.

The overload spring side plates 32 and 32' are welded to another plate 33 to form a U-shape bracket mounting. The forward end of the overload spring 34 is attached to this U-shaped bracket by bolt 35. The rear end of the overload spring 34 has an eye 36 therein through which the overload spring shackle bolt 20 is passed when assembling spring shackle 38 to the overload spring.

The overload spring U-shape bracket mounting 33 with side plates 32 and 32' is received inside the side plate legs 30 and 30' of the frame member U-shape bracket mounting. The lower ends of the overload spring U-shape bracket side plates have the holes 37 and 37' which receive the inner end of the axle tube spindle 10 and provides a bearing surface for oscillation of the tube spindle therein when the spring action occurs.

The hole 380 in the frame member 29 receives the frame member pivot pin 39 which is secured in position by means of the nut 40. Rigidly attached to the frame member pivot pin 39 is the connecting link 41. The upper end of the link 41 is rotatively attached to the control lever 42 by means of the connecting link pivot pin 43.

Figure 3:
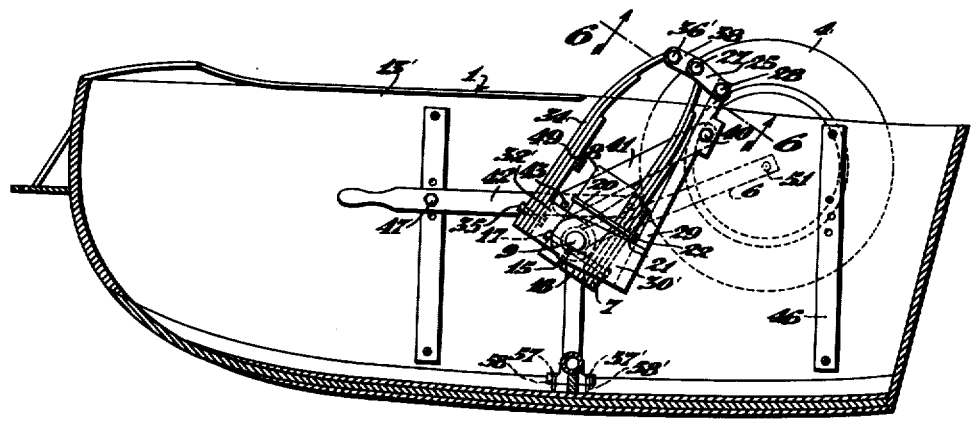
Figure 3 is a section on the same line as Figure 2 and showing the wheel unit in retracted or elevated position ready for use in the water.
Figure 4:
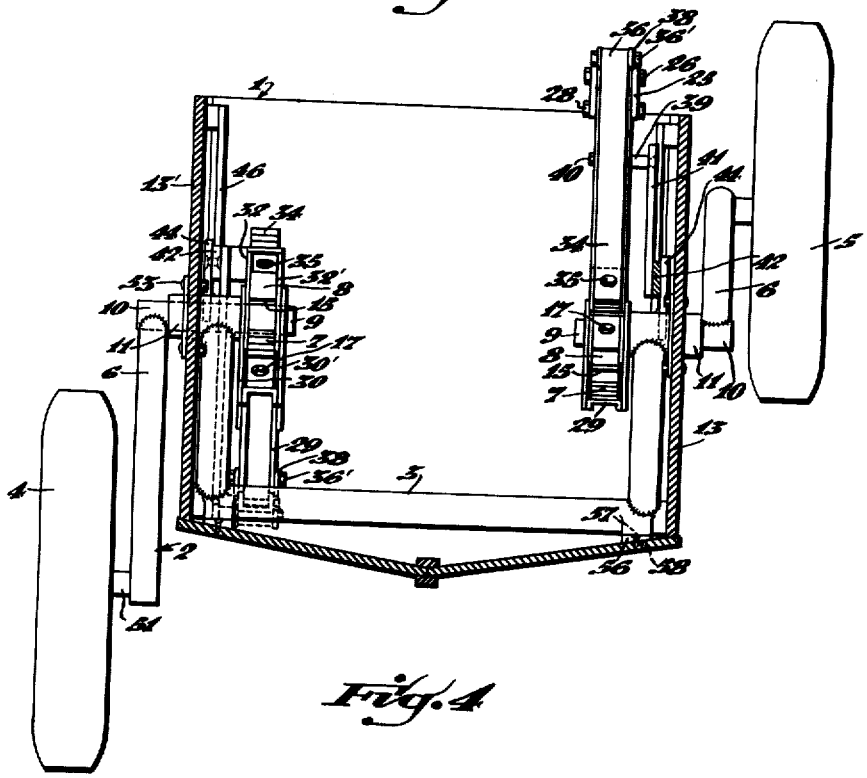
Figure 4 is a section taken on line 4—4 in Figure 1 showing one wheel unit extended and the other wheel unit retracted.

The fulcrum end of the control lever 42 is fastened to the mounting bracket 44 by the pivot pin 45. Bracket 44 is rigidly supported as by welding it to the axle tube 11. The handled end of the control lever 42 is attached to the lever anchor 46 by means of the anchor pin bolt 47 when the wheel unit is in extended position as shown in Figs. 2 and at left in Fig. 4. When the wheel unit is in retracted or upward position shown in Fig. 3 and at right in Fig. 4 it is anchored in that position by means of the pin bolt 47 in the lever anchor 48.

The rubber bumper block 49 is attached to the underside of the overload spring 34 and is designed so that it will be contacted by the rear end of the saddle block only when road, shock or overload conditions causes the spring 34 and block 8 to move toward each other.

The hole 50 is in the lower end of the tubular leg 6 and receives the road wheel spindle 51 which is fixed to the leg 6 as by welding.

Attached to the forward end of the boat hull 1 is the usual tow bar 52 for use for connecting the boat-trailer chassis 2 to a suitable motor vehicle or tractor.

The chassis 2 is attached to the boat hull 1 by means of the bolts 53 and 53' which are received in the holes 54 and 54' in the hull and the holes 55 and 55' in the inner and outer plates which are thus held in contact with the inner and outer surface of the hull and by means of the brackets 56 welded to the drop axle 3 and screws 57 and 57' are run through holes 58 and 58' into frame members of the boat hull 1.

During operation, and when the boat is being transported over the ground, the road shocks and vibrations are transmitted from the wheels 4 and 5 through the spindles 51, to the legs 6 and to the spindles 10. Movements of the legs 6 tend to rotate the spindles 10 in the tubes 11. These rotatable or oscillatable movements of the spindles 10 are resisted by the springs 7 which absorb the road shocks and vibrations of the wheels 4 and 5 from the boat hull 1. When a shock is exceptionally great, or weight in the boat hull 1 is sufficiently heavy, the torque or rotatable movement of the spindles 10 cause the saddle blocks 8 to move upwardly in contact with the blocks 49 whereby the overload springs 34 assists the springs 7 to absorb the road shocks and carry the weight of the boat and its contents.

An advantage of the invention is that the springs 7 and 34 are inside the boat hull and free from the deteriorating effects of water.

Another advantage of the invention is that when the boat-trailer is tied to a wharf, or other support, the wheels, with their pneumatic tires, cushion the boat hull against the usual rubbing and chafing movements of the boat hull against the wharf.

Another advantage of the invention is that when the units are in retracted position the axle tube 11 is located above the water line whereby the axle tube is free from contact with the water during use of the boat-trailer on the water.

Another advantage of the invention is that the design of the chassis unit 2 permits free usage of the bottom of the boat as the trailer bed for transporting freight and other materials, and the drop axle does not interfere with normal movement of persons in the boat hull. Also, the mounting of the axle tube spindle permits convenient reception of the inner end of the axle spindle 10 on which the normal load spring saddle block, overload spring carrying and frame brackets are mounted.

Still another advantage of the invention is that the wheel spindle 51 is rigidly fixed to the leg 6 which is permanently fixed to the tube spindle 10, as by welding, whereby the effects of the load and road shocks are transmitted through the axle tube 10 to the inside of the boat in which the saddle block 8 is received on the inner end of the tube spindle 9 which transmits the torque forces, developed by road shocks and the load, to the cushioning spring. This transmission of load and shock effect occurs as the saddle block tends to rotate with the tube spindle and is prevented from so doing by the action of normal load spring 7 which is rigidly attached to the bottom of the saddle block by the U bolt 20 and the spring bolt 17.

Another advantage of the invention is that the leg 7 is inclined approximately 30 degrees from vertical which allows a step-actioin as the wheel encounters obstructions on the road. As these obstructions are encountered the tendency is for the wheel to move backward with respect to the boat hull. When this backward movement occurs the wheel moves on the radius represented by the leg 6 pivoting on the spindle 10, thus causing vertical movements of the wheel when it encounters and passes over obstructions. These actions tend to cause the boat-trailer to remain on a substantially even keel, thus reducing upward or downward motions.

Another advantage of the invention is that when reversing the forward movement of the boat-trailer, the frame member 29 is contacted by the shorter leaves of the normal load spring 7 which prevents excessive reverse flexing and damage to the main spring leaf.

Another advantage of the invention is the relatively great movement of the wheel in relation to the restricted movement of the spring which is due to the relative length of the spring, saddle block and road wheel leg.

Another advantage of the invention is that the overload spring automatically compensates for the difference in weights of loads carried in the boat-trailer when being transported over the highways. In event the boat-trailer is overloaded the saddle block contacts the rubber bumper 49. If the shock or overload is considerable and constant the bumper continues to bear on the saddle block thereby transmitting this overload to the center most portion of the overload spring.

I believe that the form of the invention illustrated in the drawings and referred to in the above description, as the preferred embodiment, is efficient and practicable. However, realizing that the conditions concurrent with the adoption of the device will necessarily vary, I desire to emphasize the fact that changes in the details may be resorted to, when required, without sacrificing any of the advantages of the invention as defined in the claims. Various changes may be made in the general form and arrangement of mechanical parts described without departing from the invention. Hence I do not limit myself to the precise details of the materials or the size and shape thereof as set forth, but consider myself at liberty to make such changes and alterations as fairly fall within the spirit and scope of the appended and final claims.

What I claim as new and desire to secure by Letters Patent is:

1. The combination with a boat, of two wheels positioned outside said boat and adjacent the sides thereof, manually operative means to lower said wheels in contact with the ground to support said boat comprising rotatable means passing through the sides of said boat, leg member rigidly connected with the outer ends of said rotatable means and with the spindles of said wheels, leaf spring suspension means inside said boat rigidly connected with the inner ends of said rotatable and oscillating means, independent links having shackle connections with the free ends of the respective leaf spring suspension means, manually operable levers pivoted eccentrically of the rotatable means and having the remaining ends of the respective links pivotally connected thereto intermediate the ends of said levers and relatively closer to the pivotally mounted ends of the levers, the respective levers being independently and manually movable through one hundred eighty degrees (180°) to positions substantially parallel to the longitudinal axis of the boat, and means for anchoring the free ends of said levers to the inside of the boat.

2. The combination with a boat, of a rotatable wheel outside said boat, crank means connected with said wheel and extending rotatably through the said boat, a leaf spring suspension arm rigidly connected at its end with said crank means inside the boat, an operating lever, a rigid member connected with the bottom of the boat and providing a journal bearing for said crank means and a fixedly spaced pivotal bearing for one end of said operating lever, means to anchor the free end of the operating lever to the inside of the boat in substantial parallelism with the longitudinal axis of the boat and with its free end extending selectively to the front and rear of the boat, a link pivoted at one end to said lever relatively closer to the pivotally mounted end of said lever, means forming a shackle connection between the remaining end of the link and the outer end of the leaf spring suspension arm, and means to selectively anchor the free end of the lever in the positions named, the movement of said lever through one hundred and eighty degrees (180°) serving to rock the leaf spring suspension arm and its connected crank means through substantially ninety degrees (90°) to operative and inoperative retractable positions of the wheel as a tractional road support for the side of the boat.

3. The combination with a boat having a side wall, of a spindle bearing extending through said side wall above the water line of the boat, a bell crank structure comprising a spindle rotatable in the bearing, a leg rigidly connected to one end of the spindle outside the boat, and a leaf spring suspension arm rigidly mounted on the other end of the spindle inside the boat, a fixed bracket mounted interiorly of the boat, a lever pivoted at one end thereof on said bracket and movable about a pivotable axis eccentrically of and parallel to the axis of said spindle, means to selectively anchor the free end of the lever to the inner side of the side wall of the boat forwardly and rearwardly of said spindle whereby the lever is moved through one hundred and eighty degrees (180°) between the selective points of anchorage, a link pivotally connected to the lever relatively closer to said spindle, and means for effecting a shackle connection between said link and the free end of the leaf spring suspension arm, movement of said lever between opposite limits serving to rock the bell crank structure through ninety degrees (90°) whereby the wheel and the leg are lowered and raised to and from tractional supporting relation with the bottom of the boat, said leg in its several adjusted positions being inclined with its wheel carrying end toward the rear of the boat.

RAY F. KUNS.

REFERENCES CITED

The following references are of record in the file of this patent:

UNITED STATES PATENTS

| Number | Name | Date |
| --- | --- | --- |
| 496,663 | Miller | May 2, 1893 |
| 2,115,864 | Livermon | May 3, 1938 |
| 2,194,964 | Willson | Mar. 26, 1940 |
| 2,227,762 | Ronning | Jan. 7, 1941 |
| 2,294,109 | Donaldson | Aug. 25, 1942 |